United States Patent
Sjungargård et al.

(10) Patent No.: US 9,957,058 B2
(45) Date of Patent: May 1, 2018

(54) TANK ASSEMBLY

(71) Applicant: AIRBUS OPERATIONS LIMITED, Bristol (GB)

(72) Inventors: Petter Sjungargård, Karlstad (SE); Alessio Cipullo, Bristol (GB); Franklin Tichborne, Bristol (GB); Joseph K-W Lam, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 377 days.

(21) Appl. No.: 14/786,617

(22) PCT Filed: Apr. 9, 2014

(86) PCT No.: PCT/GB2014/051099
§ 371 (c)(1),
(2) Date: Oct. 23, 2015

(87) PCT Pub. No.: WO2014/174247
PCT Pub. Date: Oct. 30, 2014

(65) Prior Publication Data
US 2016/0074813 A1    Mar. 17, 2016

(30) Foreign Application Priority Data

Apr. 25, 2013  (GB) .................................. 1307509.8

(51) Int. Cl.
*B64D 37/02* (2006.01)
*B64D 37/32* (2006.01)
(Continued)

(52) U.S. Cl.
CPC ............ *B64D 37/02* (2013.01); *B01D 61/58* (2013.01); *B01D 69/10* (2013.01); *B01D 71/024* (2013.01);
(Continued)

(58) Field of Classification Search
CPC ...... B01D 61/58; B01D 69/10; B01D 71/024; B64D 37/00; B64D 37/02; B64D 37/06; B64D 37/30; B64D 37/32
See application file for complete search history.

(56) References Cited

U.S. PATENT DOCUMENTS 4,745,797 A    5/1988  Wegrzyn
2010/0154727 A1    6/2010  Malgorn et al.

FOREIGN PATENT DOCUMENTS

JP    2001354041 A    12/2001
KR    100216794 B1    9/1999
(Continued)

OTHER PUBLICATIONS

Search Report dated Oct. 24, 2013 in Great Britain Application No. 1307509.8.
ISR and WO in PCT/GB2014/051099, dated Aug. 11, 2014.
"Water Nano Filter—Water Purification"—Alibaba.com, obtained Dec. 6, 2013.
Bradley, David, "Leaky Graphene Oxide lets Water Pour Through", RSC Advancing the Chemical Sciences, Chemistry World (from http://www.rsc.org/chemistryworld/News/2012/January/graphene-oxide-membrane.asp), obtained Dec. 6, 2013.
Lange, Karen E., "The Big Idea—Desalination", National Geographic, Apr. 2010, pp. 32-34.
(Continued)

*Primary Examiner* — John Kim
(74) *Attorney, Agent, or Firm* — Hauptman Ham, LLP

(57) ABSTRACT

A tank assembly with a tank for storing liquid hydrocarbon, the tank having a floor for supporting a weight of the liquid hydrocarbon. A filter is fitted to the floor of the tank. The filter is arranged to allow liquid water in the tank to drain out of the tank through the filter but substantially prevent the liquid hydrocarbon in the tank from doing so. The filter has a permeation member, such as a membrane, which is formed from a material such as graphene oxide which allows liquid water in the tank to drain out of the tank by permeating through the permeation member but substantially prevent the liquid hydrocarbon in the tank from doing so.

19 Claims, 5 Drawing Sheets

(51) Int. Cl.
*B64D 37/00* (2006.01)
*B64D 37/30* (2006.01)
*B64D 37/06* (2006.01)
*B01D 71/02* (2006.01)
*B01D 61/58* (2006.01)
*B01D 69/10* (2006.01)

(52) U.S. Cl.
CPC ............. *B64D 37/00* (2013.01); *B64D 37/06* (2013.01); *B64D 37/30* (2013.01); *B64D 37/32* (2013.01)

(56) References Cited

FOREIGN PATENT DOCUMENTS

| KR | 2020027752 A | 4/2002 |
| KR | 20030089855 A | 11/2003 |
| SU | 1055661 A2 | 11/1983 |
| WO | 2011117609 A1 | 9/2011 |

OTHER PUBLICATIONS

Mathiesen, B., "Nano-scale fuel cells may be closer than we think, thanks to an inexpensive new manufacturing method"—(from http://phys.org/news11654.html) obtained Dec. 6, 2013.

"Water in the Laboratory—A Tutorial"—Lab Water Tutorial, Water Contaminants and Water Monitoring—Millipore (from http://www.millipore.com/lab_water/clw4/tutorial&tabno+5) obtained Dec. 6, 2013.

Nair et al., "Unimpeded Permeation of Water Through Helium-Leak-Tight Graphene-Based Membranes", Science, Jan. 27, 2012, vol. 335, No. 6067 pp. 442-444.

"Marine RFF Filter Funnels"—Parker, obtained Dec. 6, 2013.

Parker, Ann, "Tiny Tubes Make the Flow Go", Dec. 6, 2013.

Risbud, Aditi, "Technology Review: Cheap Drinking Water from the Ocean", obtained Dec. 6, 2013.

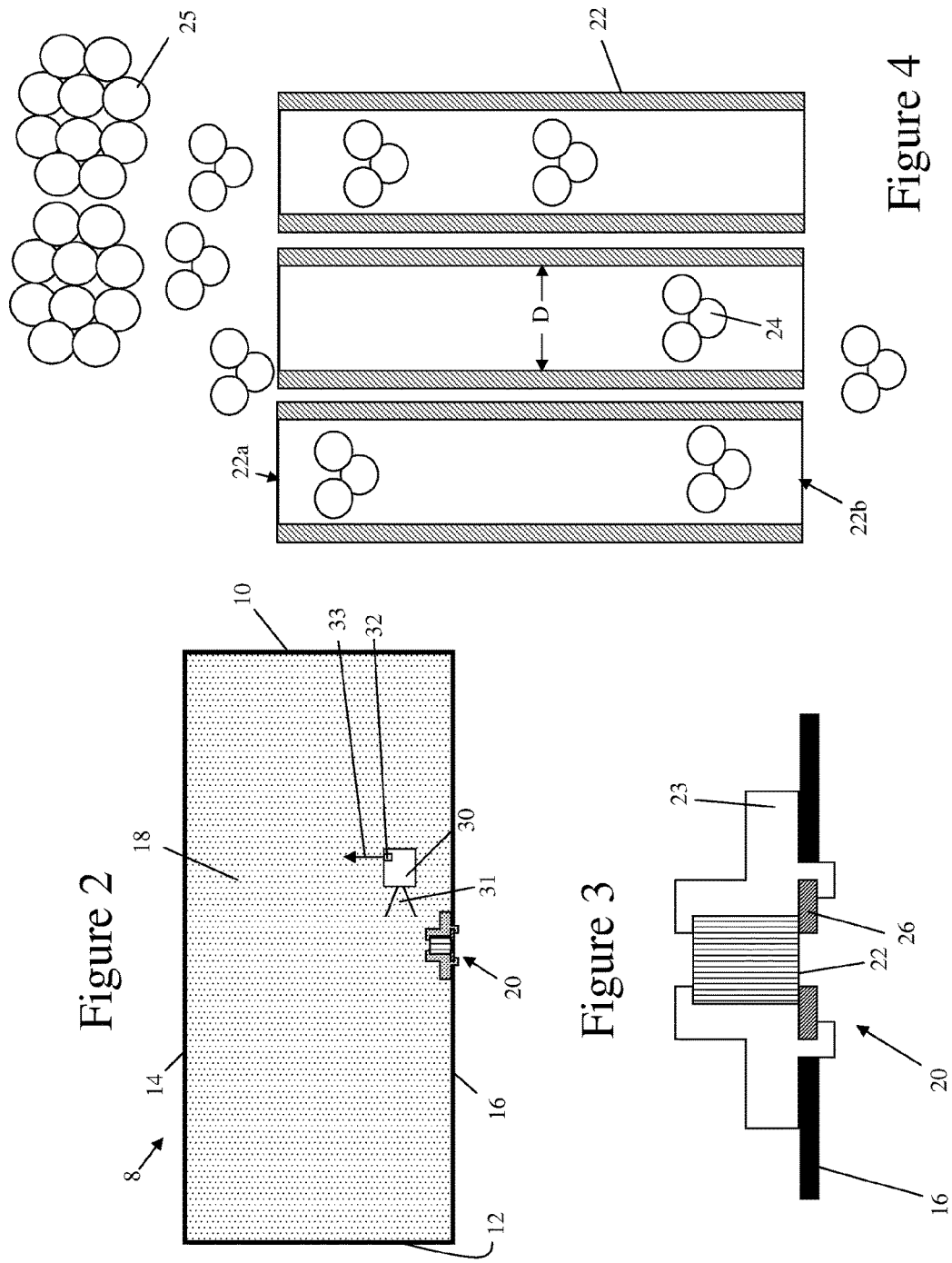

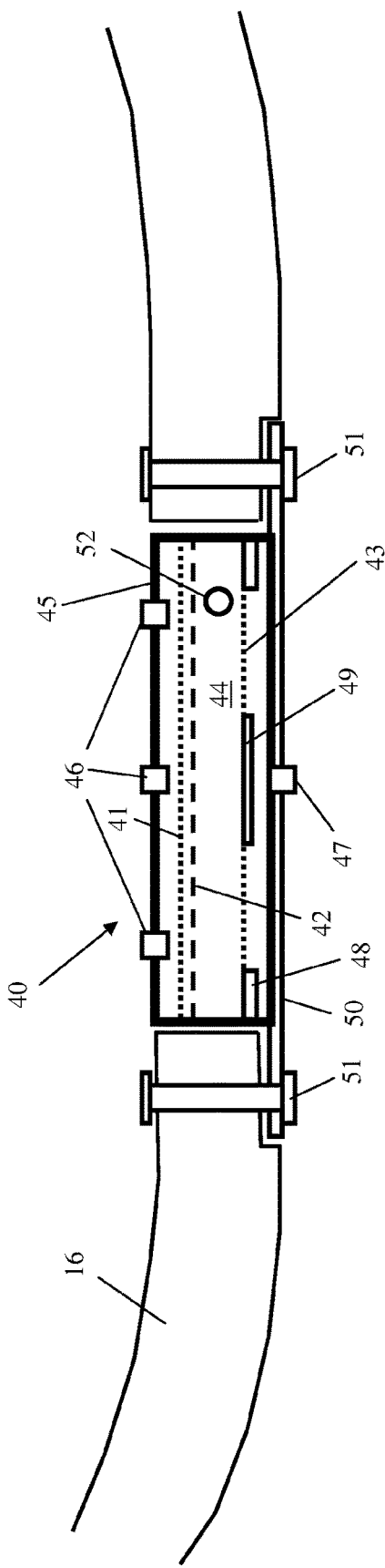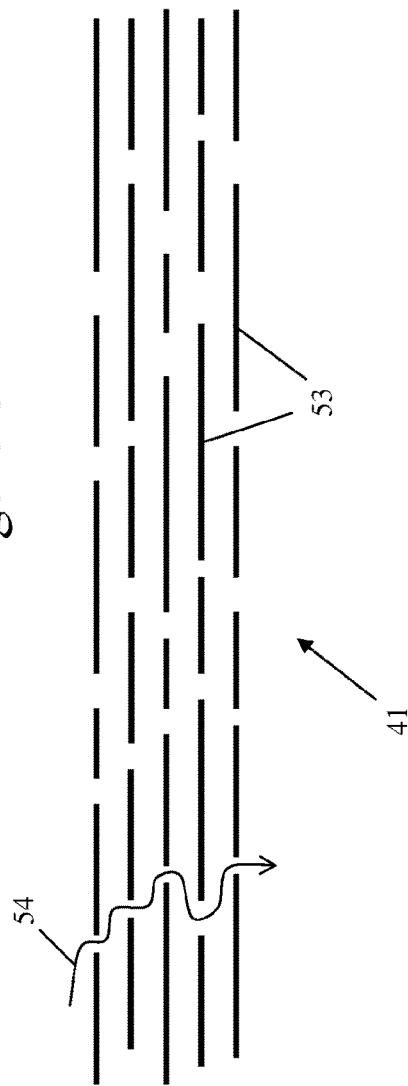

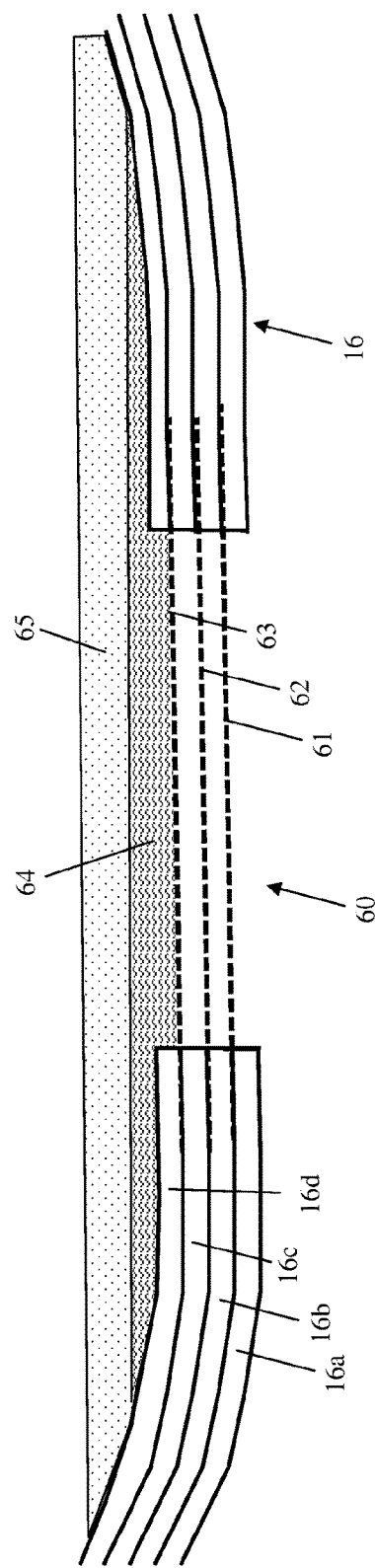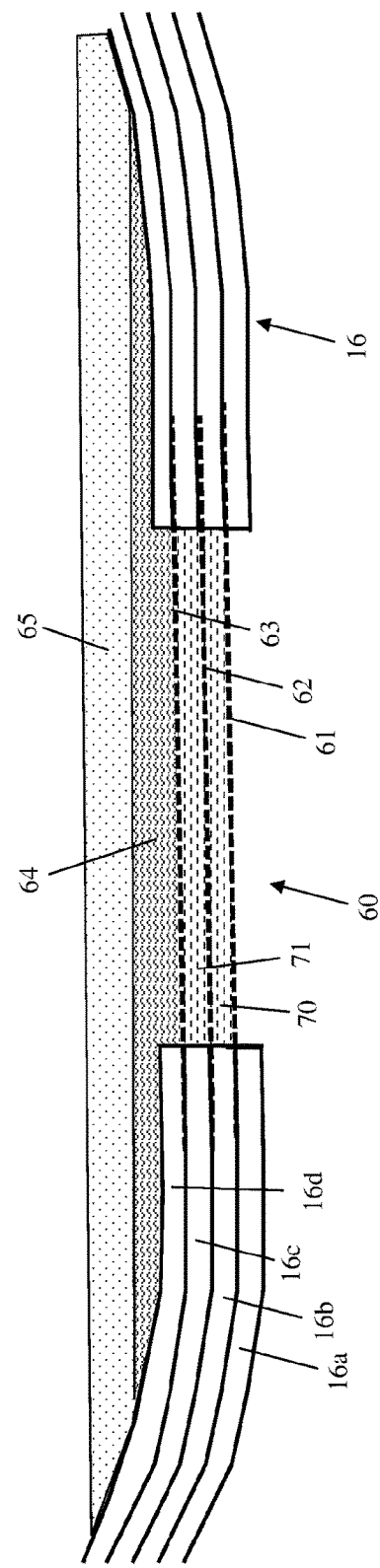

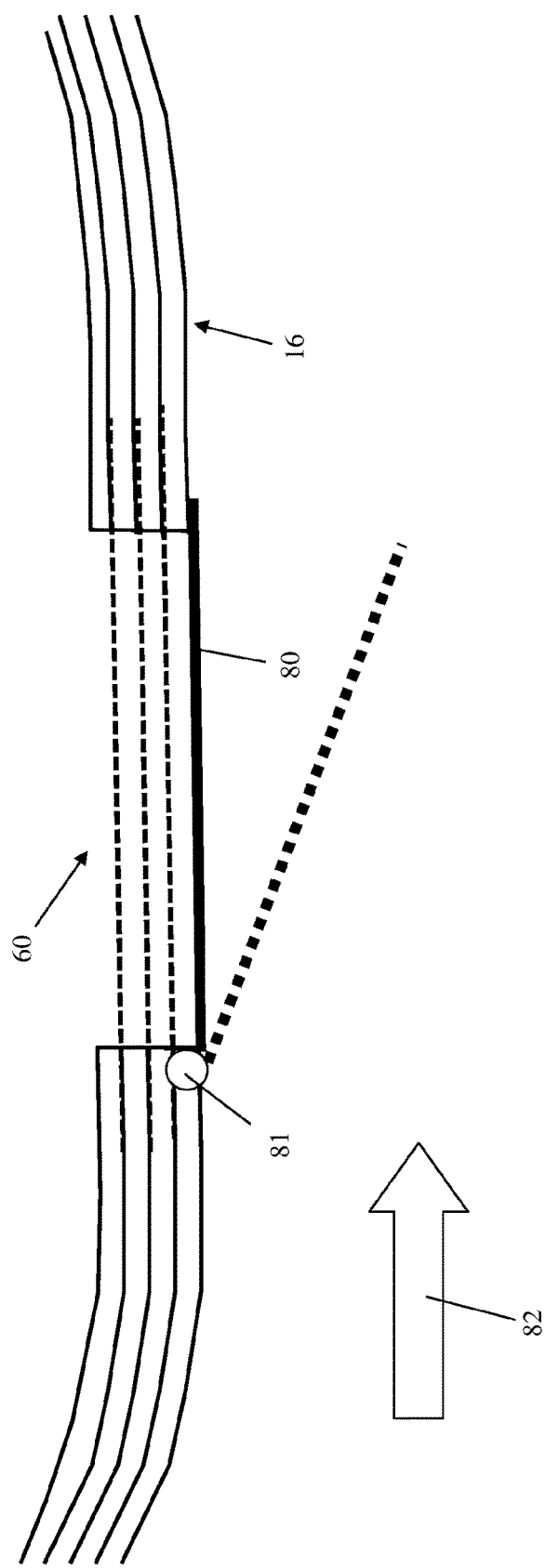

TANK ASSEMBLY

RELATED APPLICATIONS

The present application is a National Phase of International Application No. PCT/GB2014/051099, filed Apr. 9, 2014, which claims priority from Great Britain Application No. 1307509.8, filed Apr. 25, 2013, the disclosure of which is hereby incorporated by reference herein in its entirety.

FIELD OF THE INVENTION

The present invention relates to a tank assembly and associated method. The invention can be used, typically but not exclusively, to remove water from an aircraft fuel tank.

BACKGROUND OF THE INVENTION

Water contamination in aircraft fuel tanks can cause many problems with the aircraft fuel systems. As the aircraft reaches altitude, the ambient temperature drops to around −50° C. which leads to ice formation in the fuel tank. This can lead to gauging errors and failures, clogging of the fuel pumps and interference with fuel pump pressure switches. The presence of water in the fuel tank can also lead to the growth of micro biological contamination (MBC) which can lead to similar problems. It is therefore desirable to remove the water from the fuel tank before these problems occur.

A conventional method for draining water from fuel tanks involves providing water drain valves on the floor of the fuel tank. However, these water drain valves are typically unable to discriminate between water and fuel. The consequences of this are that fuel is lost from the tank when water is drained and that often insufficient water is removed to prevent the above problems. Moreover, an operator is required to drain the water from the fuel tanks when the aircraft is grounded. This method is therefore also expensive and time consuming.

"Unimpeded Permeation of Water Through Helium-Leak—Tight Graphene-Based Membranes", R. R Nair et al, Science, 27 Jan. 2012, Vol. 335, no. 6067, pp. 442-444, DOI:10.1126/science.1211694 (referred to below as "Nair et al") demonstrated that that submicrometer-thick membranes made from graphene oxide can be completely impermeable to liquids, vapors, and gases, including helium, but these membranes allow unimpeded permeation of water.

SUMMARY OF THE INVENTION

A first aspect of the invention provides a tank assembly comprising a tank for storing liquid hydrocarbon, the tank having a floor for supporting a weight of the liquid hydrocarbon; and a filter fitted to the floor of the tank, the filter being arranged to allow liquid water in the tank to drain out of the tank through the filter but substantially prevent the liquid hydrocarbon in the tank from doing so.

A second aspect of the invention provides a method of draining water from a tank storing liquid hydrocarbon, the tank having a floor for supporting a weight of the liquid hydrocarbon, the method comprising fitting a filter in the floor of the tank, the filter being arranged to allow liquid water in the tank to drain out of the tank through the filter but substantially prevent the liquid hydrocarbon in the tank from doing so.

The invention provides a tank assembly and associated method which enables water to be drained from the tank automatically (that is, without any manual intervention after the filter has been fitted) as well as reliably preventing liquid hydrocarbon in the tank from being drained along with it.

The filter typically comprises a permeation member, such as a membrane, which is formed from a material which allows liquid water in the tank to permeate through it but substantially prevents the liquid hydrocarbon in the tank from doing so. For instance the permeation member may comprise graphene oxide (typically a layered structure of graphene oxide crystallites), a structure with an array of nanoholes, or an array of vertically aligned hollow nanotubes such as carbon nanotubes.

A support grid may support the permeation member to prevent it from rupturing under the weight of the liquid hydrocarbon.

Preferably the strength of the permeation member is sufficiently high to enable it to support a pressure difference of 30,000 Pa (300 mbar) or 50,000 Pa (500 mbar). Optionally the strength of the permeation member is sufficiently high to enable it to support a pressure difference of 100,000 Pa (1000 mbar).

The filter may be fitted into a hole in the floor of the tank, typically (although not exclusively) at a low point of the floor of the fuel tank. In the case where the floor is made of a laminar composite material comprising conductive fibres (such as carbon fibres) within a relatively low conductivity matrix (such as epoxy resin) then preferably the filter provides a path for the flow of electric current across the hole. For instance the permeation member/membrane may be electrically conductive to provide a path for the flow of electric current across the hole. Alternatively a grid of conductive material may be integrated into the filter in addition to the permeation member.

A leak sensor may be arranged to detect any liquid hydrocarbon which has leaked through the filter. The leak sensor may be placed within the filter or below it.

The filter may comprise upper and lower membranes separated by a filter chamber. Optionally a liquid support layer may be provided between the membranes, which may have antifreeze properties. Optionally the lower membrane carries a seal member and is arranged to move down and close a water drain port with the seal member in the event that the upper membrane fails and allows liquid hydrocarbon to enter the filter chamber and contact the lower membrane.

The floor of the tank may comprise a stack of two or more floor layers formed with a hole. Typically these layers are formed from a composite material. The filter may comprise one or more membranes which fill the hole and is/are arranged to allow liquid water in the tank to drain out of the tank through the membrane(s) but substantially prevent liquid hydrocarbon in the tank from doing so, and the (or each) membrane has a periphery which is sandwiched between a pair of the floor layers.

A pump may be provided with an inlet located adjacent the filter, the pump being arranged to pump the liquid hydrocarbon away from the filter.

The tank is most typically a fuel tank and the liquid hydrocarbon is a liquid hydrocarbon fuel such as gasolene or kerosene. Alternatively the hydrocarbon liquid may be a hydraulic fluid or other hydrocarbon.

The assembly typically further comprises a pump for pumping the liquid hydrocarbon from the tank, for instance into an engine or another fuel tank.

The tank may be installed on an aircraft but the invention may also be implemented in, for example, fuel storage silos or fuel transport trucks. This enables water to be removed from the fuel in the silo or truck before it is pumped into an aircraft's fuel tanks.

Optionally an insulated door may be provided to cover the filter and insulate it from cold air outside the tank, wherein the door can open to enable the water to drain out of the tank through the filter.

BRIEF DESCRIPTION OF THE DRAWINGS

Embodiments of the invention will now be described with reference to the accompanying drawings, in which:

FIG. 2 is a schematic illustration of a fuel tank assembly housed within the wing of the aircraft of FIG. 1;

FIG. 3 is an expanded view of the filter shown in FIG. 2;

FIG. 4 is a schematic view of the permeation member showing its structure and mode of operation;

FIG. 5 shows an alternative filter for use in the fuel tank assembly of FIG. 2;

FIG. 6 is a schematic view of a graphene oxide membrane showing its structure and mode of operation;

FIG. 7 shows a further alternative filter for use in the fuel tank assembly of FIG. 2;

FIG. 8 shows a further alternative filter for use in the fuel tank assembly of FIG. 2; and FIG. 9 shows a filter with a swinging door.

DETAILED DESCRIPTION OF EMBODIMENT(S)

Figure 1:
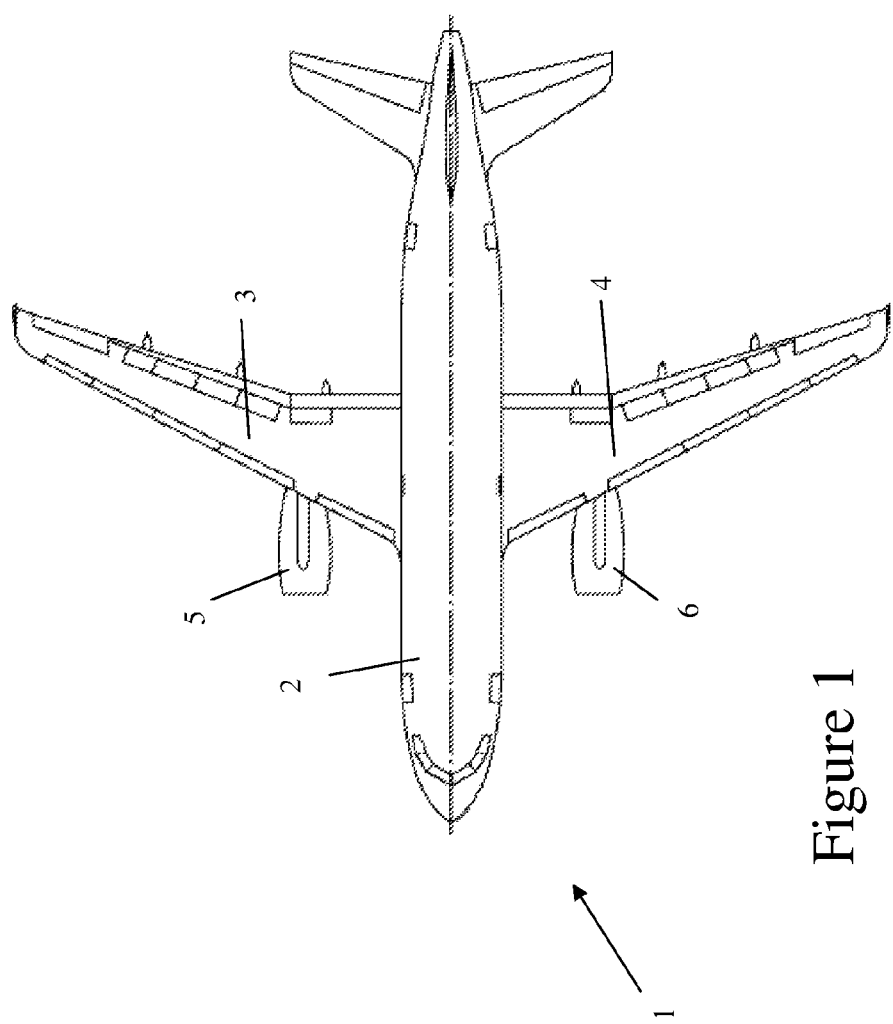
FIG. 1 is a schematic illustration of an aircraft.

Referring to FIG. 1, an aircraft 1 comprises a fuselage 2 carrying a pair of wings 3, 4. Each wing 3, 4 carries an engine 5, 6. Fuel for each engine is stored in a centre tank within the fuselage 2 and one or more wing tanks within the wings 3, 4. The description below refers to one of the wing tanks but could equally refer to the centre tank or any additional wing tanks.

FIG. 2 is a schematic illustration of a wing tank 8 which comprises front and rear spars 10, 12 and upper and lower covers 14, 16 which are attached to, and extend between, the spars 10, 12. A pair of ribs (not shown) provide the spanwise boundaries of the tank 8. The wing tank 8 is filled with kerosene liquid fuel 18. The lower cover 16 provides a floor of the fuel tank supporting the weight of the fuel 18.

A filter 20 is fitted into a hole in the lower cover 16 at a low point of the cover 16. Although only one filter 20 is shown in FIG. 2, two or more filters 20 may be incorporated in the lower cover 16 if required. The filter 20 comprises a housing 23 and a permeation member 22 fitted in the housing 23. The permeation member 22 is retained within the housing 23 by a circlip 26 which can be removed to assemble or disassemble the permeation member 22 and housing.

The permeation member 22 is designed such that it lets water molecules 24 pass through (as shown in FIG. 4) but prevents jet fuel (kerosene) molecules 25 from doing so. When the aircraft 1 is at altitude, any water in the fuel tank will solidify to form ice due to the low ambient temperatures (~−50° C.). However, in this case, the solidified water will be unable to exit the tank through the permeation member 22. The water may only drain out of the tank through the filter 20 when the ambient temperature is sufficiently high that the ice melts to form liquid water—that is, when the aircraft is grounded and in some circumstances during ascent and descent of the aircraft when in use. The description below assumes that the water is in liquid form.

As water is more dense than kerosene, it will tend to sink to the bottom of the wing tank 8. The fluid head generates a pressure at the bottom of the tank 8 and optionally a pump (not shown) may also be provided in order to increase this pressure. The pressure causes the water to pass through the permeation member 22 from inside the tank to the ambient air outside the tank. As the internal surface of the permeation member 22 is smooth and water repellent, a large quantity of water can pass through its pores without fouling them. The filter may be designed to allow 1-2 g of liquid water to drain from the tank per second. Assuming that the aircraft is grounded for approximately 2 hours between flights, this would allow approximately 7-14 kg of water to be automatically drained during each turnaround of the aircraft.

A permeation member 22 with a pore size greater than a molecular weight cutoff (MWCO) of 18 g/mol (often written as Dalton [Da]), which corresponds to water molecules, but a molecular weight cutoff (MWCO) less than 56 g/mol, which corresponds to the smallest molecule type in kerosene (Butylene Olefin), would let water pass through it and block jet fuel (kerosene) from passing through it.

The permeation member 22 may be an ultrafiltration (UF) membrane comprising an array of nanoholes or an array of vertically aligned hollow nanotubes (such as carbon nanotubes) as shown schematically in the close-up view of FIG. 4. Note that only three of such nanotubes are shown in FIG. 4 but it will be understood that the permeation member would comprise an array of many of such nanotubes. Also the aspect ratio of the nanotubes will be significantly higher than the aspect ratio shown in FIG. 4.

Each nanotube forms a hollow tube with an axial channel which is approximately circular in cross section with a width D which does not vary along the length of the nanotube. Each channel has an inlet 22a and an outlet 22b. The channels allow liquid water 24 in the fuel tank to drain out of the fuel tank through the channel but substantially prevent liquid hydrocarbon fuel 25 in the fuel tank from doing so.

Returning to FIG. 2—the wing tank comprises a fuel pump 30 with an inlet 31 and an outlet 32 which is connected to a fuel line 33 leading to one of the engines 5, 6. The inlet 31 is located adjacent the filter 20. The fuel pump 30 provides suction at inlet 31 in order to transport fuel from the tank, through the outlet 32 and into the fuel line 33 or for recirculation of fuel within the tank. By placing the inlet 31 adjacent to the filter 20, any kerosene molecules which could potentially clog the pores of the filter will be sucked into the fuel pump, clearing the pores of the permeation member. This design is beneficial as the filter is effectively cleaned during operation of the fuel pump, thus extending the lifetime of the filter.

An alternative filter 40 for use in the fuel tank of FIG. 2 instead of the filter 20 is shown in FIG. 5. The filter 40 comprises an upper membrane 41 made of a layered structure of graphene oxide crystallites manufactured by the process described in Nair et al. This material allows liquid water in the tank to drain out of the tank by permeating through the upper membrane 41 but substantially prevents liquid hydrocarbon in the tank from doing so. FIG. 6 shows a possible permeation mechanism. The membrane 41 has a layered structure of graphene oxide crystallites 53 with a network of nanocapillaries providing a route for permeation of water 54 through the thickness of the membrane.

The upper membrane 41 has a thickness sufficient to support static pressure from the fuel head. This pressure is given by ($\rho$*g*h). The height different (h) between the wing tip and the wing root is typically between 2 m and 7 m. Taking the worst case scenario (i.e. 7 m) the static pressure is therefore 800×9.81×7=55,000 Pa (550 mbar). Allowing 3G (3*gravity) acceleration in an emergency event, this makes the fluid static pressure up to 3*55,000=165,000 Pa (1650 mbar). This is approximately 1.6 atmosphere. Thus the upper membrane 41 may have a thickness sufficient to support static pressure of the order of 165,000 Pa. A support grid 42 supports the upper membrane 41 to prevent it from rupturing.

The filter 40 has an unsupported lower membrane 43 also comprising a layered structure of graphene oxide crystallites manufactured by the process described in Nair et al. The membranes 41, 43 are separated by a filter chamber 44. The lower membrane 43 allows liquid water in the chamber 44 to drain out of the chamber 44 by permeation through the lower membrane 43 but substantially prevents any leaked liquid hydrocarbon in the chamber 43 from doing so.

The graphene oxide membranes 41, 43 are mounted in a cylindrical housing 45 with an upper wall containing multiple inlet ports 46 and a lower wall containing a single water drain port 47. The housing 45 is mounted to the lower cover 16 by a plate 50 and removable fasteners 51. The plate 50 lies flush with the outer aerodynamic surface of the lower cover 16 to minimise drag. The filter 40 can be easily installed and removed from the outside of the fuel tank by inserting or removing the fasteners 51.

The lower membrane 43 is mounted to the housing 45 by an annular elastic support 48 and carries a rubber fuel seal member 49 on its lower surface. During normal operation of the filter, water flows through the inlet ports 46 and drain port 47 and the chamber 44 contains air at ambient pressure. In the event of rupture of the upper membrane 42, hydrocarbon fuel (and/or liquid water) will fill the chamber 44 (forcing out the air) and contact the lower membrane 43 which must now support the full static pressure of the fuel in the tank. The flexible elastic support 47 enables the lower membrane 42 to move down due to the raised pressure difference across it and close the water drain port 47 with the seal member 49. A fuel leak sensor 52 senses the presence of the fuel in the chamber 44 and provides an alert for maintenance staff.

Another alternative filter 60 for use in the fuel tank of FIG. 2 instead of the filter 20 is shown in FIG. 7. The floor 16 of the tank comprises a stack of composite layers—in this case only four layers 16a-d are shown but in practice there will be a much larger number of layers. Each layer 16a-d comprises a composite material—typically unidirectional carbon fibres impregnated with an epoxy resin matrix. The floor is formed by forming a stack of such layers in an uncured state and then curing them under pressure. Before the layers 16a-d are stacked together, they are each formed with a respective hole, and the graphene oxide membranes 61-63 are laid up covering the holes with the annular periphery of each membrane sandwiched between a respective pair of the floor layers 16a-d. The membranes 61-63 are formed from the same graphene oxide material as the membranes 41, 43 described above, and they collectively allow liquid water 64 in the tank to drain out of the tank by permeating through them but substantially prevent liquid hydrocarbon 65 in the tank from doing so.

Optionally a colour coded chemical may be provided to detect any leaking fuel on the lowest graphene oxide membrane 61, since this membrane 61 is visible to ground staff when the aircraft is on the ground. A suitable chemical consists essentially of a major portion of a dry inert mineral carrier and from about 0.1 to about 5.0 percent by weight of a direct dye soluble in water and low chain alcohols, as described in U.S. Pat. No. 4,745,797.

The gaps between the membranes 61-63 may contain air as shown in FIG. 7 or they may by filled with liquid trapped between the membranes to form liquid support layers 70, 71 shown in FIG. 8. The layers 70, 71 are formed from a liquid which allows water in the tank to drain out of the tank through them but substantially prevents liquid hydrocarbon in the tank from doing so. The liquid support layers 70, 71 make all of the membranes 61-63 act together mechanically and hence strengthen the filter. The liquid forming the support layers 70, 71 may be a liquid with antifreeze properties, such as an alcohol.

In the embodiments of FIGS. 7 and 8 only three membranes 61-63 are shown, but a larger number of membranes (four or more) may be used if required. Optionally the central membrane 62 may be replaced by a heater grid with its periphery sandwiched between the composite floor layers 16b,c. Alternatively a heater grid could be embedded within one of the alcohol layers 70, 71. The heater grid may be operated to keep the temperature of the filter above 0° C. at all times so that ice does not block the membranes.

It may be desirable to protect the filter from the very cold air flow outside the aircraft in flight. FIG. 9 shows an embodiment in which an insulated door 80 is mounted to the lower cover at a hinge 81 on the forward edge of the hole. Airflow 82 during flight forces the door 80 to the closed position shown in solid lines, insulating the filter membranes from the cold airflow. When the airflow reduces below a certain level (typically after landing) then the door automatically rotates down to the position shown in dashed lines so the water can drain out.

In the case where the floor 16 is made of a laminar composite material such as a carbon-fibre reinforced polymer laminate, then the hole in the floor (into which the filter 20, 40, 60 is fitted) can cause problems in the event of a lightning strike. Therefore preferably a grid of conductive material is integrated into the filter to conduct current across the hole. In the case where the permeation member 22, 41, 63 is electrically conductive, then the permeation member itself may provide the necessary path for the flow of current across the hole. In the case of a graphene oxide membrane, this may be achieved by etching the membrane to provide a grid of un-oxidised (and hence electrically conductive) graphene on the surface of the membrane.

Alternatively a grid of conductive material may be integrated into the filter in addition to the permeation member. For instance in the case of FIG. 5 the support grid 42 may be a conductive metal grid which provides this function as well as supporting the membrane 41. Alternatively the heater grid mentioned above may perform this function as well as heating the filter to prevent icing. Alternatively an additional metal grid (not shown) may be provided with a primary function of conducting current across the hole in the event of a lightning strike.

Although the invention has been described above with reference to one or more preferred embodiments, it will be appreciated that various changes or modifications may be made without departing from the scope of the invention as defined in the appended claims.

The invention claimed is:

1. A tank assembly comprising a tank for storing liquid hydrocarbon, the tank having a floor for supporting a weight of the liquid hydrocarbon; and a filter fitted to the floor of the tank, the filter comprising a permeation member which is formed from a material which allows liquid water in the tank to drain out of the tank through the permeation member but substantially prevents the liquid hydrocarbon in the tank from doing so.

2. The assembly of claim 1 wherein the permeation member comprises graphene oxide.

3. The assembly of claim 2 wherein the permeation member comprises a graphene oxide membrane.

4. The assembly of claim 2 wherein the graphene oxide permeation member comprises a layered structure of graphene oxide crystallites.

5. The assembly of claim 1 further comprising a support grid which supports the permeation member to prevent it from rupturing under the weight of the liquid hydrocarbon.

6. The assembly of claim 1 wherein the permeation member is sufficiently strong to enable it to support a pressure difference of 30,000 Pa (300 mbar).

7. The assembly of claim 1 wherein the filter comprises an upper membrane which is arranged to allow liquid water in the tank to drain out of the tank through the upper membrane but substantially prevent the liquid hydrocarbon in the tank from doing so, and a lower membrane which is positioned below the upper membrane and separated from the upper membrane by a filter chamber, wherein the lower membrane is arranged to allow liquid water in the filter chamber to drain out of the filter chamber through the lower membrane but substantially prevent liquid hydrocarbon in the filter chamber from doing so.

8. The assembly of claim 7 wherein the filter comprises a water drain port below the lower membrane through which the water flows during normal operation of the filter, the lower membrane carries a seal member, and the lower membrane is arranged to move down and close the water drain port with the seal member in the event that the upper membrane fails and allows liquid hydrocarbon to enter the filter chamber and contact the lower membrane.

9. The assembly of claim 1 wherein the floor of the tank comprises a stack of two or more floor layers formed with a hole, the filter comprises one or more membranes which fill the hole and is/are arranged to allow liquid water in the tank to drain out of the tank through the membrane(s) but substantially prevent liquid hydrocarbon in the tank from doing so, and the (or each) membrane has a periphery which is sandwiched between a pair of the floor layers.

10. The assembly of claim 1 wherein the floor of the tank comprises a stack of floor layers formed with a hole, the filter comprises a stack of two or more membranes which fill the hole and are collectively arranged to allow liquid water in the tank to drain out of the tank through the stack of membranes but substantially prevent the liquid hydrocarbon in the tank from doing so, and each membrane has a periphery which is sandwiched between a respective pair of the floor layers.

11. The assembly of claim 1 wherein the filter comprises two or more membranes which are collectively arranged to allow liquid water in the tank to drain out of the tank through the membranes but substantially prevent the liquid hydrocarbon fuel in the tank from doing so, and a liquid support layer between each adjacent pair of membranes, the (or each) liquid support layer being arranged to allow liquid water in the tank to drain out of the tank through the liquid support layer but substantially prevent the liquid hydrocarbon in the tank from doing so.

12. The assembly of claim 11 wherein the (or each) liquid support layer comprises a liquid with antifreeze properties.

13. The assembly of claim 1 further comprising a heater arranged to heat the filter to prevent icing of the filter.

14. The assembly of claim 1 further comprising a pump with an inlet located adjacent the filter, the pump being arranged to pump the liquid hydrocarbon away from the filter.

15. The assembly of claim 1 wherein the tank is a fuel tank.

16. The assembly of claim 1 wherein the filter is fitted into a hole in the floor of the tank, the floor is made of a laminar composite material comprising conductive fibres within a relatively low conductivity matrix, and the filter provides a path for the flow of electric current across the hole.

17. The assembly of claim 1, wherein the tank contains the liquid hydrocarbon.

18. An aircraft comprising an assembly according to claim 1.

19. A method of draining water from a tank storing liquid hydrocarbon, the tank having a floor for supporting a weight of the liquid hydrocarbon, the method comprising fitting a filter in the floor of the tank, the filter comprising a permeation member which is formed from a material which allows liquid water in the tank to drain out of the tank through the permeation member but substantially prevents the liquid hydrocarbon in the tank from doing so.

* * * * *